(12) United States Patent
Hoffman

(10) Patent No.: US 9,311,117 B2
(45) Date of Patent: Apr. 12, 2016

(54) SYSTEM AND METHOD OF CAPACITY MANAGEMENT

(71) Applicant: Unisys Corporation, Blue Bell, PA (US)

(72) Inventor: Philip M Hoffman, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 297 days.

(21) Appl. No.: 13/709,611

(22) Filed: Dec. 10, 2012

(65) Prior Publication Data

US 2014/0164749 A1    Jun. 12, 2014

(51) Int. Cl.
*G06F 15/16*    (2006.01)
*G06F 9/445*    (2006.01)
*G06F 21/73*    (2013.01)

(52) U.S. Cl.
CPC ............ *G06F 9/44505* (2013.01); *G06F 21/73* (2013.01)

(58) Field of Classification Search
CPC .............................. G06F 21/73; G06F 9/44505
USPC ................... 709/229, 220, 221, 222
See application file for complete search history.

(56) References Cited

U.S. PATENT DOCUMENTS

| | | | | |
|---|---|---|---|---|
| 6,917,958 | B1 * | 7/2005 | Howe et al. | 709/203 |
| 8,176,151 | B2 * | 5/2012 | Drake | G06F 8/71 |
| | | | | 709/220 |
| 8,332,464 | B2 * | 12/2012 | Dispensa | H04L 29/12009 |
| | | | | 709/203 |
| 8,656,386 | B1 * | 2/2014 | Baimetov et al. | 718/1 |
| 2010/0218235 | A1 * | 8/2010 | Ganot | H04L 41/0813 |
| | | | | 726/1 |
| 2011/0289314 | A1 * | 11/2011 | Whitcomb | 713/155 |
| 2012/0011358 | A1 * | 1/2012 | Masone | 713/153 |
| 2013/0086572 | A1 * | 4/2013 | Iriumi | 717/168 |
| 2013/0110991 | A1 * | 5/2013 | Fujimoto et al. | 709/220 |
| 2014/0143397 | A1 * | 5/2014 | Gutt et al. | 709/223 |

OTHER PUBLICATIONS

"Change Processor Name Permanently", Dec. 2012, Tweak and Trick, pp. 1-2.*

* cited by examiner

*Primary Examiner* — Jonathan Bui
(74) *Attorney, Agent, or Firm* — Richard J. Gregson

(57) ABSTRACT

Systems and methods are disclosed herein to a method for providing a system name of a computer system, comprises generating a system ID key based on a system type of the computer system using an external key generator module; installing the system ID key on the computer system in an active operating state by extracting the system name from the system ID key; updating operating system structures for immediate use of the system name; writing a machine name index into halt/load parameters that are implemented by the computer system for subsequent restarts of the computer system after suspending the computer system, wherein the machine name index identifies a location of the system name in a system registry; and writing the system name into the system registry from the system ID key.

15 Claims, 3 Drawing Sheets

FIG. 3

| Index | Link Description | Examples |
|---|---|---|
| 1 | 8 bit machine name index, 6 character machine name | index 1-8<br><br>"CS4280" "CS4290" "CS6280" "CS6290"<br>"FS4280" "FS4290" "FS6280" "FS6290" |
| 2 | 8 bit machine name index, "n" character long machine name (59 character maximum) | index 1-8<br><br>"CS4280" "CS4290" "CS6280" "CS6290"<br>"FS4280" "FS4290" "FS6280" "FS6290" |
| 3 | "n" character product line (59 character maximum) | "ClearPath MCP Server"<br>"ClearPath FS Series" |

302, 304, 306

SYSTEM AND METHOD OF CAPACITY MANAGEMENT

TECHNICAL FIELD

The present invention relates generally to techniques for providing processing services within a computing system, and more particularly, to techniques for providing a virtual, unique system identity.

BACKGROUND

Computer systems, such as servers, may have a number of different specifications, configurations, pricing methods, and licensing techniques, which may depend on business methods implemented by a vendor or an information technology company. Customers of information technology companies and vendors have a wide variety of needs, and providing options and customizable configurations allows a customer to tailor a computer system, billing method, and licensing technique to his individual needs.

Computer systems sold or licensed by vendors or information technology companies are intended to perform only the tasks that have been negotiated, and certain licenses and systems management routines confirm that only licensed hardware is being implemented and only authorized tasks are being performed by the computer system. As a specific example, a piece of hardware may have a unique serial number, and the computer system confirms that the piece of hardware has the expected, licensed serial number before performing computing tasks. If an unlicensed piece of hardware is detected, the computer system will not perform any computing tasks. If a licensed piece of hardware fails, it must be replaced with a new piece of hardware that also has a unique serial number. So, not only does the hardware have to be replaced, but the system will not compute until a new license is received for the replacement piece of hardware. Also, companies billing the customer for the computer system must update their records to reflect the change in licensing and serial numbers. Such a replacement method is a tedious process for the customer and the information systems company. A system of this nature is described in U.S. patent application Ser. No. 11/647,683, entitled "System and Method for Providing a Mechanism to Virtualize a Perpetual, Unique System Identity on a Partitioned Computer System," and filed Dec. 29, 2006.

Beyond system maintenance, the needs of a customer may change over time, and a computer system that met or exceeded customer needs initially may become insufficient or cease to be economical. As an example, a customer may initially find that a metering method of billing provides cost savings over a capacity on demand system of billing. As the customer grows, expands, or changes business models, the customer may find that the capacity on demand method of billing is more economical than the metering method. Given the nature of the licensing, the computer system may be licensed for capacity on demand or programmed to perform only metering. Changing a system's billing method may be accompanied with a change the name of the system, which may require a lengthy update. Currently the name of the system and the system product line is part of the firmware build. Thus, if the system name is to be changed, the firmware must be updated, and updating the firmware may require a system reboot, which may interrupt critical computer system tasks, delete important data, and require a significant period of time.

A computer system licensed by a customer may require a name change and a corresponding product line change for a variety of reasons. In one example, a marketing department of the information systems company may change the system names or the product line of a system. Also, responding to customer needs may require the changing of a name of a system. In either situation, a firmware update would be required to the disappointment of the customer.

Thus, a method of providing a new system name and product line to a computer system without requiring a firmware update or even a reboot of the computer system is desired.

SUMMARY

The systems and methods described herein attempt to overcome the drawbacks discussed above by providing a method for changing a system name of a computer system, a product line of the computer system, a business model of the computer system, and number of visible processors of the computer system without requiring a firmware update. The system name may be changed by providing a virtual system name, which is provided by an external key generator unit controlled by an information system's company.

In one embodiment, a method for providing a system name of a computer system, comprises generating a system ID key based on a system type of the computer system using an external key generator module; installing the system ID key on the computer system in an active operating state by extracting the system name from the system ID key; updating operating system structures for immediate use of the system name; writing a machine name index into halt/load parameters that are implemented by the computer system for subsequent restarts of the computer system after suspending the computer system, wherein the machine name index identifies a location of the system name in a system registry; and writing the system name into the system registry from the system ID key.

In another embodiment, a method for providing an immediate uninterrupted installation of a unique system identity, a system name, a product line, and a number of visible processors of a computer system, comprises generating a system ID key based on a system type of the computer system, a number of processors enabled in the computer system, and a product line of the computer system; installing the system ID key to the computer system in an active operating state by extracting the unique system identity, the system name, the product line, and the number of visible processors from the system ID key; updating operating system structures for immediate use of the unique system identity, system name, product line, and pool of visible processors; writing a machine name index into halt/load parameters that are implemented by the computer system for subsequent restarts of the computer system after suspending the computer system, wherein the machine name index identifies a location of the system name, product line, and number of visible processors in a system registry; and writing the system name, product line, and number of visible processors into the system registry from the system ID key.

In another embodiment, a computer program product for generating an external key comprising a non-transient computer readable medium having a computer readable program, wherein the computer readable program including a key generator module that when executed on a processor causes a computer to: generate a system ID key to be installed on the computer based on a system type of the computer, a number of processors enabled in the computer, and a product line of the computer, wherein the system ID key provides the computer a system name, a product line, and a number of visible processors.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 3 illustrates a table that includes the components of the system ID key according to an exemplary embodiment.

DETAILED DESCRIPTION

Figure 1:
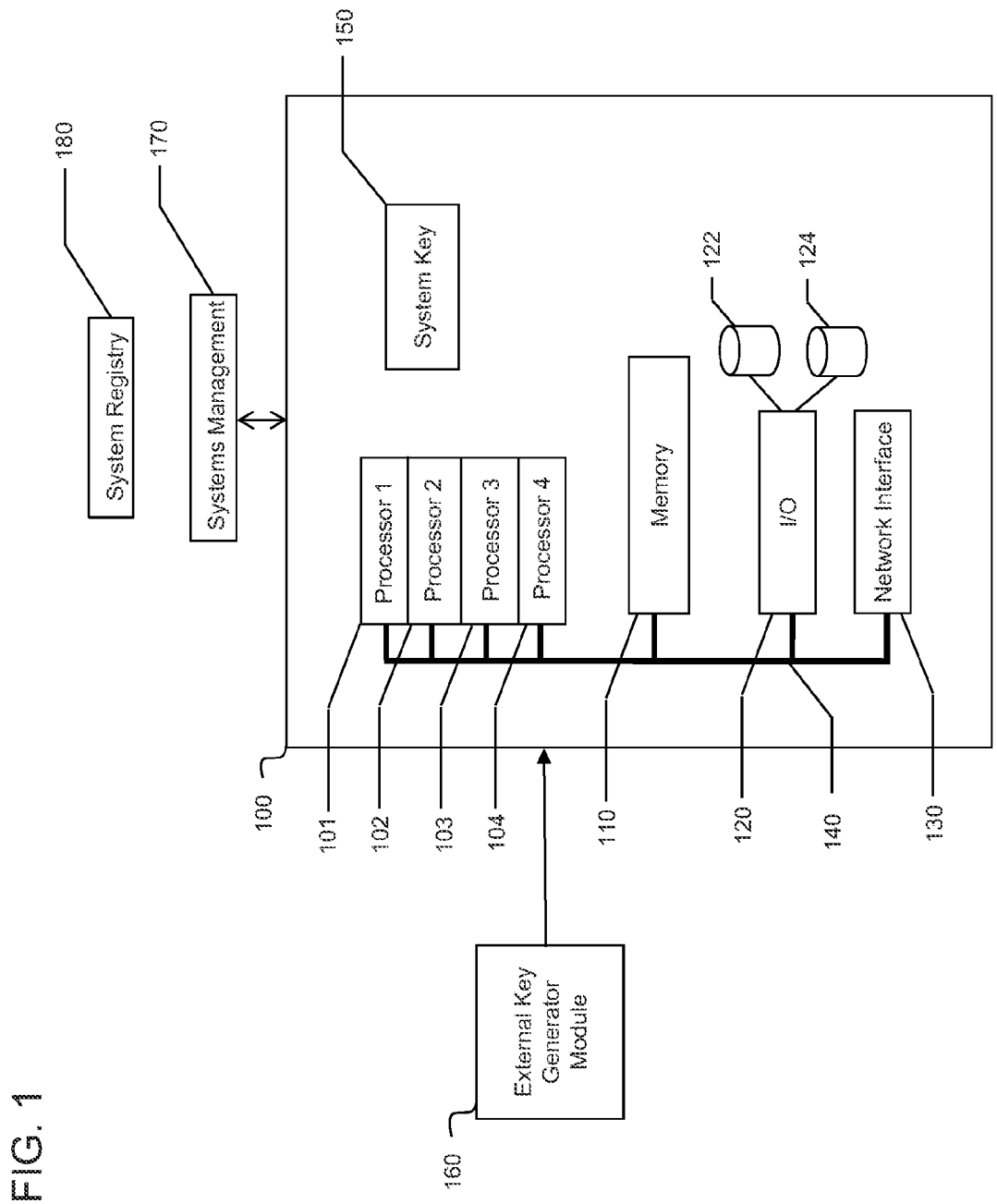
FIG. 1 illustrates a computer system implementing a system ID key according to an exemplary embodiment.

Reference will now be made in detail to the preferred embodiments, examples of which are illustrated in the accompanying drawings. Turning now to the drawings, in which like numerals represent like (but not necessarily identical) elements throughout the figures, exemplary embodiments of the present invention are described in detail. FIG. 1 illustrates a computer system implementing a system ID key according to an exemplary embodiment.

Referring to FIG. 1, a computer system 100 includes a plurality of processors 101, 102, 103, 104, a block of memory 110, an input/output (I/O) interface 120, a network interface 130, and a data bus 140. The plurality of processors 101, 102, 103, 104, the memory block 110, the I/O interface 120, the network interface 130 may all communicate with one another through the data bus 140. While the elements listed above are illustrated in FIG. 1, it is to be understood that the computer system 100 may include many more computing components, such as a graphics module, a hard drive, a CD-ROM drive, DVD-ROM drive, tape drive, audio modules, universal serial bus (USB) ports, power supplies, cooling devices, heat sinks, or any other components that may be included in a computing device. Also, while the computing device 100 illustrates one partition and one cell, the computing device may include more than one partition or more than one cell, which may be running various operating systems. If additional cells and/or partitions are included, a server control unit may further be included to provide supervisory control over the entire computing system 100. The size and configuration of the computing system 100 may increase or decrease depending on computing model, billing method, or customer need.

The plurality of processors 101, 102, 103, 104 included in the computer system 100 illustrate an example of a multi-processor system. Each processor may perform a different task, and each processor may be differently configured to accommodate specific tasks. Alternatively, all of the processors 101, 102, 103, 104 may be constructed in the same manner, and one or more of the processors 101, 102, 103, 104 may be a spare processor included for redundancy. Additionally, one or more of the processors 101, 102, 103, 104 may be included to provide supervisory control over the other processors 101, 102, 103, 104. While four processors 101, 102, 103, 104 are illustrated in FIG. 1, the exemplary embodiments may be applied to any multi-processor system and as well as to a single processor system The memory block 110 may include any computer storage medium, either volatile or non-volatile, removable or non-removable, such as FLASH, RAM, ROM, EEPROM, or any other storage medium that is configured to store information in any method or technology for information storage. The memory block 110 is configured to store computer readable information, such as computer readable instructions and data. The memory block 110 may be implemented to store program code to direct the processors 101, 102, 103, 104 to process information and requests to or from other computing systems connected to the computer system 100 in any manner, such as through the network interface 131).

The network interface 130 provides a network connection means and network protocols useful for sending and receiving information from and to other computer systems connected to the computer system 100. The network interface 130 may be connected to a network of any type, such as a local area network (LAN), a wide area network (WAN), or a wireless local area network (WLAN). The network interface 130 may communicate with other computer systems on the network through network protocols, such as TCP/IP, FTP, SSH, or any other network protocol. In addition, the network interface 130 may be connected to a network through any means including wireless means, such as Bluetooth, IEEE 802.11, and infrared, or wired means, such as Ethernet, firewire, and coaxial.

Peripheral devices 122 and 124 are connected to the I/O interface 120, and the peripheral devices 122 and 124 allow the computer system to receive inputs from a user and output data and information to the user. The peripheral devices may include a mouse, a keyboard, a monitor, a printer, a scanner, a touch screen, buttons, or any other peripheral device useful for receiving data from a user and outputting data to a user.

The computer system 100 further includes a system key 150 that is provided by the external key generator module 160. The external key generator 160 may be operated by an information systems company or vendor that provided the computer system 100. The external key generator 160 may remain in the possession of the information systems company and may be used for system changes, upgrades, and downgrades. The external key generator module 160 installs the system key 150 on the computer system 100 for a plurality of reasons including, providing the system with an identity, setting a system capacity, turning on and off system components, and providing unique serial numbers for licensing. Each of these specific reasons will be discussed in detail below, but the system key 150 may perform additional tasks when installed on the system 100.

As one example of the features of the system key 150, when the system 100 is manufactured, the hardware components, such as the processors 101, 102, 103, 104 or the memory 110, are not branded with a serial number. Instead, the system key 150 is installed on a basic computer system with a running operating system to provide a virtual serial number for the hardware components. Thus, if a component needs to be replaced, the new component may be installed and given the same virtual serial number as the part that the new component replaced. Rather than changing the entire licensing paradigm, a new system ID key can be installed to account for the new piece of equipment. By providing the original manufacturing (virtual) serial number to the hardware, the computer system 100 retains all of its installed licenses, even though new hardware has been included.

As another example, when a new system 100 is manufactured, it may have certain characteristics such as four processors 101, 102, 103, 104, a certain amount of memory, etc. A customer may not have need for all of the computing power included in the system 100, and thus, the information system company may provide a customer with a base system 100 and disable some hardware and computing resources to meet the customer's needs rather than manufacture a unique system with the customer's desired hardware. The system key 150 is the means by which hardware components are enabled or disabled. A first system key may turn on 50% of the processors (101 and 102) included in the system 100. Meanwhile, a second key may enable all of the processors (101, 102, 103, 104) included in the system 100. Furthermore, the first system key may be associated with a first computer model, and the second system key may be associated with a second computer model. Thus, by simply installing a new system key 150 into the operating system of the computer system 100, the configuration of the computer system changes, the model of the computer system 100 may change, and the name of the machine may change as well. By disabling or enabling components of a base system 100, the information system company may provide financial savings to the customer while saving money itself because all machines, regardless of customer selected configuration, may be manufactured with the same components and by the same process. Further, as the needs of a customer change, the information systems company may simply enable disabled hardware components using a new system key 150 for an instant upgrade that does not require the customer to buy additional hardware or configure and deploy a new system.

When a system key 150 is installed, the system does not have to be paused or rebooted. Instead, the machine type and name information is immediately applied using the system ID key and updating operating system tables and notifying the systems management 170 of system identity, name information, product line, and visible processor count changes. System management 170 updates the system registry 180 with name information from the system ID key 150 so that outboard support processes are also immediately updated with the change, and other licensing data is saved in persistent storage. Thus the update is successfully installed on system 100 with no loss or data and no service interruption.

The information system company may provide the system key 150 in a number of different ways, such as by plugging into a local port or providing the key over a network such as the Internet. In the Internet example, a customer is given the option to simply call a customer service representative of the information system company, agree to a new contract for the new system, and receive a different system while still on the call. This nearly instantaneous upgrade ability makes the system 100 very easy to scale for customer needs, and attractive to customers who's computing needs may change over time.

According to the exemplary embodiments, a system name, a product line, and other system characteristics, may be branded to the computer system 100 using a system ID key generated by the external key generator module 160 without updating system management firmware. In the preferred embodiment, the branding method is performed on a running system. However, the branding method may be performed when the computer system 100 is halted by installation of the system ID key 150 directly into the systems management 170, which updates the system registry 180 and systems management local persistent storage with licensing information from system key 150.

A system ID key 150 is only installed one time in the life of a system, unless significant component replacement requires synchronization of the virtual system serial number with the underlying hardware. When the computer system 100 is halted and subsequently restarted from a suspended state, systems management 170 reads name information from the system registry 180 and places it in the halt/load parameters. Systems management 170 also initializes operating system high memory structures with licensing data read from local persistent storage. During initialization of the computer system 100, the operating system determines the system name and product line information using information in the halt/load parameters. The operating system also determines the identity of the system and the prior licensing state using the licensing data initialized in the high memory structures. During normal operation, the licensing state of the computer system 100 is redundantly captured on a halt/load disk to restore system identity and name information in the case that the system registry 180 data is lost or corrupt.

Figure 2:
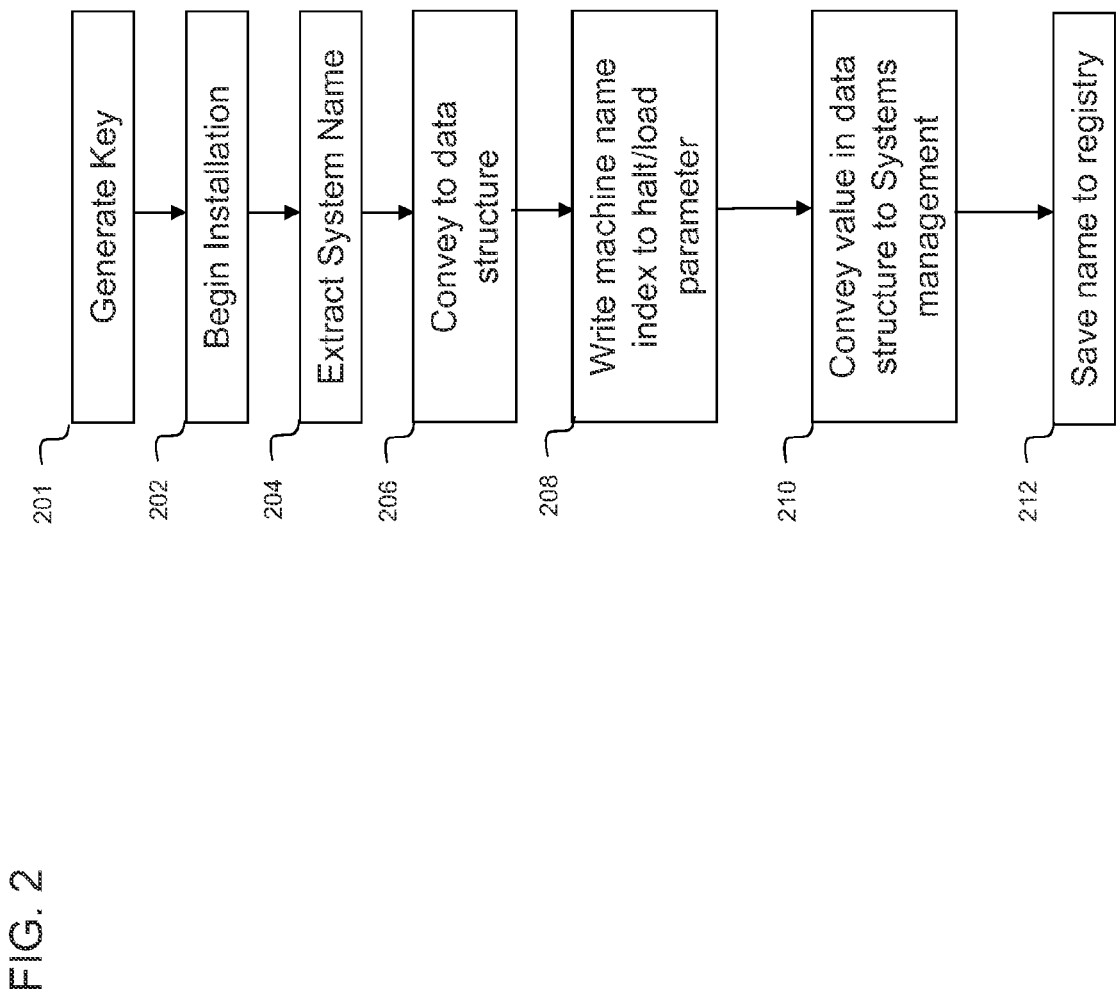
FIG. 2 illustrates a method of updating a system name with a virtual system name according to an exemplary embodiment.

The method of installing the system ID key is illustrated with reference to FIG. 2. The branding method begins at step 201 when the external key generator module 160 generates a system ID key 150 for the computer system 100. The system ID key 150 may be generated based on the type of system, the number of processors to include, the amount of other hardware purchased by the customer, and any other identity specific configurations of the computer system 100. Subsequently, in step 202, the system ID key 150 is installed into a system. A machine ID is embedded into the system ID key 150. When the key 150 is installed, the system 100 extracts the system name from the machine ID in step 204. The computer system 100 is also able to extract product line information from the machine ID. Further, if the system ID key 150 is used to enable or disable processors of the computer system 100, the number of processors that are to be displayed to a console within the operating system of the computer system 100 may also be extracted by the computer system 100 using the machine ID. As discussed above, the system ID key 150 may also update serial numbers, set licensing information, enable or disable hardware, or set other parameters, but these features will not be discussed in further detail below.

Subsequently, the computer system 100 conveys the system name, product line, and number of displayed processors to a data structure maintained by systems management firmware 170 to store system identity information in step 206. This data structure may be maintained in an area of high memory and may persist beyond a suspension, stop, or start of the computer system 100. The data structure may store additional information, such as licensing values, metered utilization data, and other system keys.

In step 208, the system 100 overwrites the current halt/load parameter name data with the key machine name index, system name, and product line. This machine name index points the halt/load parameters to took in the correct location for the system name, product line, and number of processors to display in the console. It is used in exported system interfaces to return machine name and product line information to user applications. The system name information previously stored in the halt/load parameters was initialized during system boot by system management firmware using system name information located in the system registry. Exemplary halt/load parameter machine name link words are illustrated in FIG. 3. As show in FIG. 3, the machine name includes a six character machine name 302, a tong machine name 304, which may be up to 59 characters long, and a product line 306, which also may be up to 59 characters in length. Although not shown in FIG. 3, the machine name link words may further include the number of processors to display in the console of the operating system and other information.

Referring again to FIG. 2, in step 210, the values stored in the data structure are subsequently written into systems management, and in step 212, systems management saves the system name to the system registry. The product line and the number of processors to be displayed are also saved in the system registry in the same manner as the system name. As a result, when the computer system 100 is restarted, systems management initializes the halt/load parameters with the machine name index, system name, and product line values obtained from the system registry. Once the correct name is found by the halt/load parameters, and once the machine is restarted, user applications will display the correct system name, product line, and number of processors running. Similarly, support processes that have direct access to the system registry will also display the correct system name, product line, and number of processors running.

As described above, the system name may be updated for the computer system 100 without updating the firmware of the computer system 100. Because the firmware may remain unaffected by the system key update, the system does not need to be shut down during installation of the system ID key. Since an update may be applied without the worry of losing data or waiting through a lengthy reboot, system names may be updated quickly and easily. Thus, for example, a capacity on demand system, with a first system name, may be updated to a metering system, with a second name quickly and simply. Or in another example, a mid-range system with a first system name and a first product line may be upgraded to a high-end system with a second name and a second product line without affecting the firmware.

The embodiments described above are intended to be exemplary. One skilled in the art recognizes that numerous alternative components and embodiments that may be substituted for the particular examples described herein and still fall within the scope of the invention.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "generating" or "synchronizing" or "outputting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A method for providing a system name of a computer system, comprising:

generating a system ID key based on a system type of the computer system using an external key generator module, wherein the system ID key comprises a system name;

installing the system ID key on the computer system in an active operating state by:

extracting the system name from the system ID key;

updating operating system structures for immediate use of the system name;

writing a machine name index into halt/load parameters that are implemented by the computer system for subsequent restarts of the computer system after suspending the computer system, wherein the machine name index identifies a location of the system name in a system registry; and writing the system name into the system registry from the system ID key.

2. The method of claim 1, wherein the system ID key is provided to the computer system through a wide area network from the external key generator module.

3. The method of claim 1, wherein the system type includes the number of processors enabled by the system ID key, whether the computer system is a billed by metering or capacity on demand, a marketing title, or hardware components enabled by the system ID key.

4. The method of claim 1, wherein the system ID key includes virtual serial numbers to be assigned to hardware components of the computer system.

5. The method of claim 1, wherein the system ID key is adapted to enable or disable hardware components of the computer system reflecting a client selected computer system configuration.

6. The method of claim 1, wherein writing the system name into the system registry from the system ID key, comprises:

saving the system name extracted from the system ID key to a data structure in high memory;

writing the system name from the data structure into systems management; and saving the system name to the system registry.

7. The method of claim 1, further comprising:

restarting the computer system from the suspended state using the halt/load parameters;

locating, by the halt/load parameters, the location of the system name in the system registry; and displaying the system name in an operating system running on the computer system.

8. The method of claim 1, wherein the external key generator module is maintained and controlled by a vendor of the computer system.

9. A method for providing an immediate uninterrupted installation of a unique system identity, a system name, a product line, and a number of visible processors of a computer system, comprising:

generating a system ID key based on a system type of the computer system, a number of processors enabled in the computer system, and a product line of the computer system, wherein the system ID key comprises a unique system identity, a system name, a product line, and a number of visible processors from the system ID key;

installing the system ID key to the computer system in an active operating state by:

extracting the unique system identity, the system name, the product line, and the number of visible processors from the system ID key;

updating operating system structures for immediate use of the unique system identity, system name, product line, and pool of visible processors;

writing a machine name index into halt/load parameters that are implemented by the computer system for subsequent restarts of the computer system after suspending the computer system, wherein the machine name index identifies a location of the system name, product line, and number of visible processors in a system registry; and writing the system name, product line, and number of visible processors into the system registry from the system ID key.

10. The method of claim 9, wherein the system ID key may be provided to the computer system through a wide area network from the external key generator module.

11. The method of claim 9, wherein the system type may be the number of processors enabled by the system ID key, whether the computer system is a billed by metering or capacity on demand, a marketing title, or hardware components enabled by the system ID key.

12. The method of claim 9, wherein the system ID key further includes virtual serial numbers to be assigned to hardware components of the computer system.

13. The method of claim 9, wherein the system ID key is further able to enable or disable hardware components of the computer system reflecting a client selected computer system configuration.

14. The method of claim 9, wherein writing the system name into the system registry from the system ID key comprises:

saving the system name, product line, and number of visible processors extracted from the system ID key to a data structure in high memory;

writing the system name, product line, and number of visible processors from the data structure into systems management;

saving, by the systems management, the system name, product line, and number of visible processors to the system registry.

15. The method of claim 9, further comprising:

restarting the computer system from the suspended state using the halt/load parameters;

locating, by the halt/load parameters, the location of the system name, product line, and number of visible processors in the system registry; and displaying the correct system name, product line, and number of visible processors in an operating system running on the computer system.

* * * * *